FIG. 1.

July 6, 1965  H. BARUCH ETAL  3,192,968
APPARATUS FOR PERFORMING ANALYTICAL PROCEDURES
Filed July 2, 1962  6 Sheets-Sheet 5

INVENTORS
HANS BARUCH
DALNY TRAVAGLIO
BY Schapp & Hatch
ATTORNEYS

United States Patent Office 3,192,968
Patented July 6, 1965

3,192,968
APPARATUS FOR PERFORMING
ANALYTICAL PROCEDURES
Hans Baruch, Berkeley, and Dalny Travaglio, Kensington, Calif., assignors, by mesne assignments, to Warner-Lambert Pharmaceutical Company, Morris Plains, N.J.
Filed July 2, 1962, Ser. No. 207,121
18 Claims. (Cl. 141—82)

The present invention relates to improvements in an apparatus for performing analytical procedures, and more particularly to an apparatus suitable for handling and treating liquid samples in accordance with predetermined analytical procedures.

Many types of chemical analyses require the processing of a great number of samples of similar character. The repetitive performance of similar operations lends itself to automation. The use of automatic analyzing equipment can result in a material savings in the time of the operator, and has the further advantage of increasing the accuracy of the analyses by reducing the chance of error.

However, it is important to use definite fixed analytical procedures for carrying out the analyses. These procedures have been carefully worked out and provide a standard which is of value to the person receiving and interpreting the analytical results. It is important to adhere to these standards, and therefore such steps as heating for a fixed period of time and other treatments must be carefully accomplished. It is of course necessary that all measurements of material and other process steps utilized be carefully controlled in order to adhere to the required standards and provide reliable results.

In accordance with the present invention, we have provided an apparatus capable of carrying out analytical steps according to procedures which are substantially the same as the procedures heretofore accomplished by laboratory technicians. The apparatus is designed and constructed in such a way that operations are accomplished which include measuring and transferring samples by the use of pipettes or similar devices, the addition of reagents at specified timed intervals, carrying out of reactions under carefully controlled temperatures for a measured period of time, and transferring the solutions thus obtained to other containers where the final measurements are carried out automatically. The system has its movements adjustably indexed so that the unit can be programmed to operate according to any given standard analytical procedure.

Accordingly, it is seen that the apparatus of the present invention is designed to provide a completely automated chemistry in a compact instrument occupying very little laboratory space. The device is designed to transfer samples between the present apparatus and other modules of automated analytical equipment, if desired, and to carry the samples through one or more cyclic paths when passing through the apparatus. This cyclic path is preferably a circular path which is provided by one or more rows of sample sites on a process turntable. The turntable contains electrical controls which consist of a cyclic timer and a timed delay which controls the turntable drive means. With these controls, the movement of the sample through the apparatus may be varied and timed according to any desired program. The apparatus also provides certain manual controls such as pump settings and other adjustable mechanisms for providing reagent delivery and the removal of material at any desired location in the system. Once the apparatus has been programmed for a particular analytical procedure, it is capable of carrying out each of a large number of desired analyses rapidly and without variation in procedure.

Accordingly, it is the primary object of the present invention to provide an automatic analytical apparatus adapted to carry out certain of the complex steps utilized in standard analytical procedures, and which is adapted to function as a component, or module, of a modularized automated system containing any other components necessary to provide all of the required analytical steps.

Another object of the present invention is to provide an automatic analytical apparatus which is versatile and which may be easily programmed to provide a variety of functions and to conduct a number of analytical procedures simultaneously, the apparatus being flexible as to the sequence in which functions are performed and the timing or duration of each operation.

A further object of this invention is the provision of an automated analytical apparatus of the character described which is continuous in operation and is capable of carrying out its programmed procedures without undue contamination by previously handled material.

A still further object of the present invention is to provide an automatic analytical apparatus of the character described which will maintain the samples in the same sequential relationship with respect to the other samples during the entire operation so as to make each individual sample readily identifiable at all times.

Still another object of this invention is to provide an automated analytical apparatus which is fabricated from liquid handling components capable of operation in the presence of corrosive liquids, and which provides a long useful life of accurate operation.

Further objects and advantages of our invention will appear as the specification continues, and the new and useful features of our automated analytical apparatus will be fully defined in the claims attached hereto.

The preferred form of our invention is illustrated in the accompanying drawings, forming a part of this description, in which.

While we have shown only the preferred form of our invention, it should be understood that various changes or modifications may be made within the scope of the claims hereto attached, without departing from the spirit of the invention.

Figure 1:
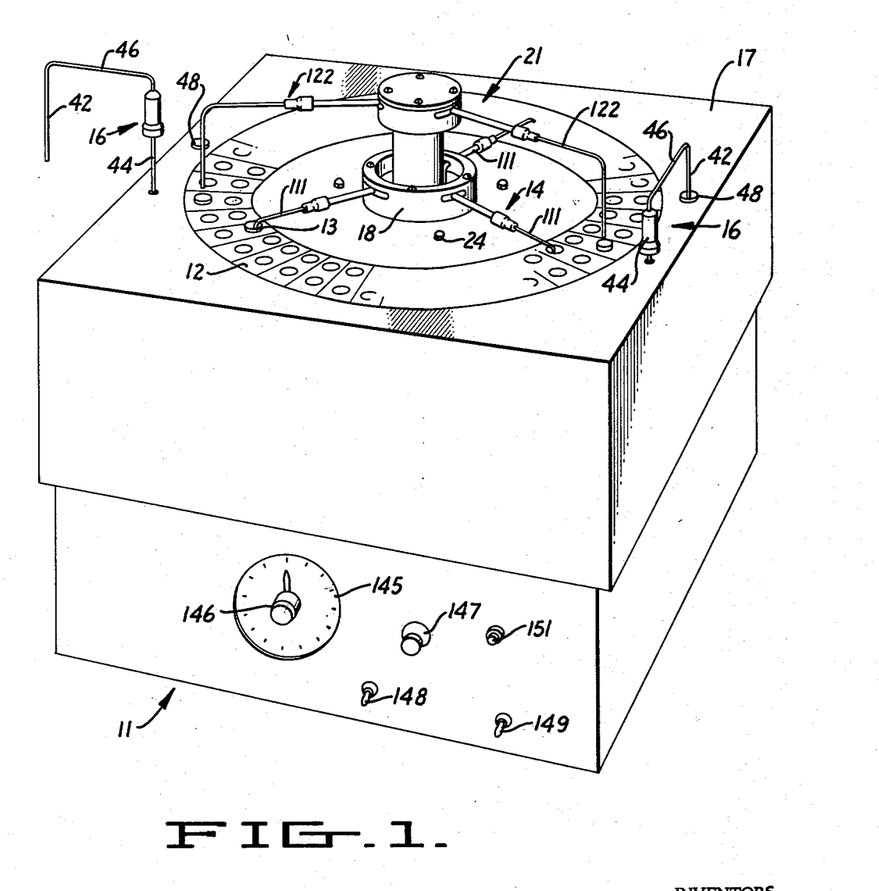
FIGURE 1 is a perspective view of a typical apparatus constructed in accordance with the present invention.

Referring to FIGURE 1 in detail, there is shown an apparatus 11 for automatically conducting analytical procedural steps, comprising a plurality of containers 13 adapted to be positioned at sample stations 12 for receiving one or more liquids at any of said sample stations, a conveyor means 14 for conveying said containers, and a transfer device 16 for moving liquids into and out of said containers at the sample stations. In general, the sample stations 12 are located or positioned where definite operations may take place such as addition of sample material to the container, removal of sample material from the container, addition of diluent, addition of reagent, or physical treatment such as heat irradiation. In this way, programming may be achieved by determining which operations should take place and at which sample stations so that duration between operations may be obtained by virtue of duration of movement of the conveyor means.

The apparatus 11 comprises a housing 17 which contains the various components in compact relation therein. As shown in FIGURE 1, the housing may comprise an upper section which contains most of the mechanical parts, and a lower section which receives the various electrical controls and any of the various pumps used for measuring and delivering liquids. If desired, certain of these components may be provided in different housings instead of all being present within the housing 17.

Figure 3:
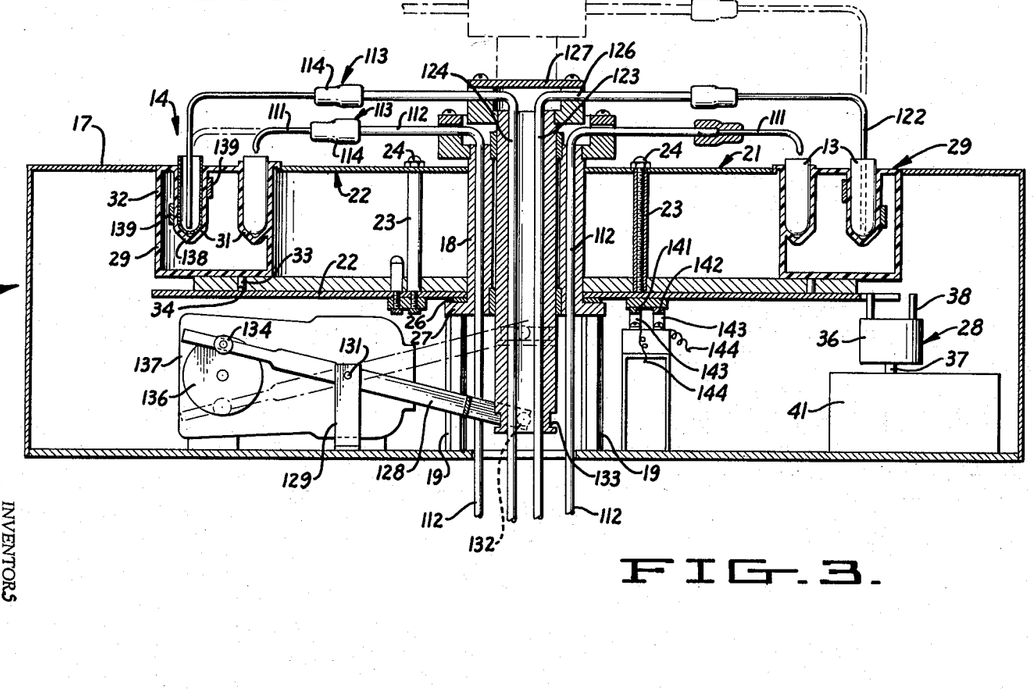
FIGURE 3, a cross-sectional view of the apparatus illustrated in FIGURE 2 taken substantially in the plane of line 3—3 thereof.

As best seen in FIGURE 3, the housing 17 is provided with a central hub section 18 which is carried in fixed relation to the housing by means of brackets 19. This hub is used to carrry the conveyor means 14 as well as certain of the structures used for transporting reagents, samples, wash water and other liquids.

As best seen in FIGURE 3, the conveyor means 14 comprises a turntable 21 comprising a pair of disc shaped members 22 each having a bore through its central portion of a size sufficient to allow the disc shaped members to fit rotatably around central hub 18, said disc shaped members being held together in spaced relation by a plurality of posts 23, and bolts 24. As here shown, the lower disc shaped member 22 comprises two individual discs in face to face relation with the disc shaped member adapted to ride on a bearing 26 which in turn is held in place by a flange 27 on the central hub 18. In this way, the turntable 21 is mounted for free rotation within the housing 17.

The turntable is provided with a drive means 28 which drives the unit by engagement with the disc shaped member 22 at the periphery thereof according to a predetermined program (see FIGURE 3). In the apparatus shown, the drive means provides intermittent rotation and halting of the turntable with each arcuate movement being substantially the same and each length of arc moved being an even fraction of a circle. A container 13 is preferably provided at each halted position so that each sample station 12 is always provided with a container when the turntable is stationary.

When the turntable is halted, the containers are located at the sample stations 12 where various treatments may be effected. In order to provide a container 13 at each of the sample stations 12 around the periphery of the turntable 21, it is desirable to provide a series of block units 29 fitting symmetrically on the turntable. As here shown, each block unit has a pair of recesses 31 adapted to receive two containers 13 and provide a pair of concentric circles of containers moving through two concentric circles of sample stations. If desired, the recesses could themselves serve as the container or any other suitable means could be used for positioning the containers in the block units 29 at the desired position. Each block unit 29 comprises a housing 32 having a boss 33 on the bottom thereof adapted to fit into a recess 34 in lower disc shaped member 22. In this way, the block units 29 are positioned in proper spaced relation around the periphery of the turntable so that the containers are disposed in two concentric circles which are rotated in a circular path according to the predetermined program provided through drive means 28.

Drive means 28 comprises a drive member 36 mounted on shaft 37 and a pair of drive pins 38 at each end of a diameter on the face of the drive member 36. The drive pins 38 are adapted to fit into slots 39 on disc shaped member 22 of turntable 21.

Figure 2:
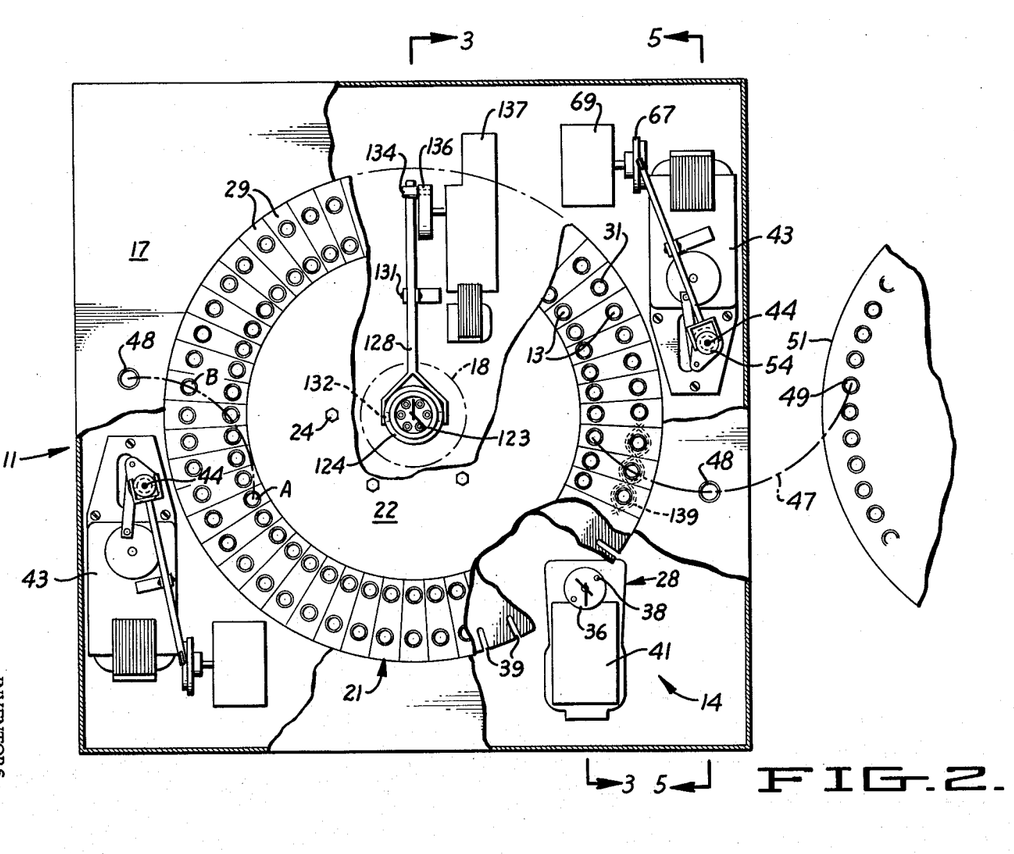
FIGURE 2, a plan view of the apparatus shown in FIGURE 1 with certain of the parts broken away in order to illustrate internal structure.

As best seen in FIGURE 2, rotation of drive pin 38 in the amount of one-half revolution causes slots 39 to advance one position. It is also seen that drive pins 38 serve to hold the turntable in a stationary position while the drive means 28 is halted. Rotation of drive means 28 may be provided by a motor 41 or any other suitable drive means. As here shown, the drive means is controlled electrically through suitable timers and relays capable of providing the desired rotation from drive motor 41.

In order to move the samples or other liquids into or out of position in the containers 13 at sample stations 12, one or more transfer devices 16 are provided. These devices generally comprise a probe 42 adapted to be moved into and out of position at a plurality of different places, a transfer mechanism 43 for providing the desired motion of the probe, and associated pumps together with valving therefor for providing the desired motion of liquids into and out of the probes.

The transfer mechanism 43 is used to rotate and reciprocate a tube 44 which carries the probe 42 at a fixed parallel distance therefrom by means of tube 46 which serves as an arm. Thus, rotation of tube 44 causes probe 42 to move through an arc and axial movement of tube 44 causes probe 42 to undergo the same axial movement. As best seen in FIGURE 2, a transfer mechanism 43 is adapted to cause the probe to move through arc 47 with arc 47 being in communication with a sample site on the inner circle of sample stations in turntable 21, a sample site in the outer row of sample stations in turntable 21, a well 48 which is positioned in the housing of the apparatus, and a sample station in another device such as sample site 49 in turntable 51. If desired, the probe may move into and out of operative position at more or less stations, however it is the function of the transfer device 43 to operate the probe between at least two sample positions.

Figure 5:
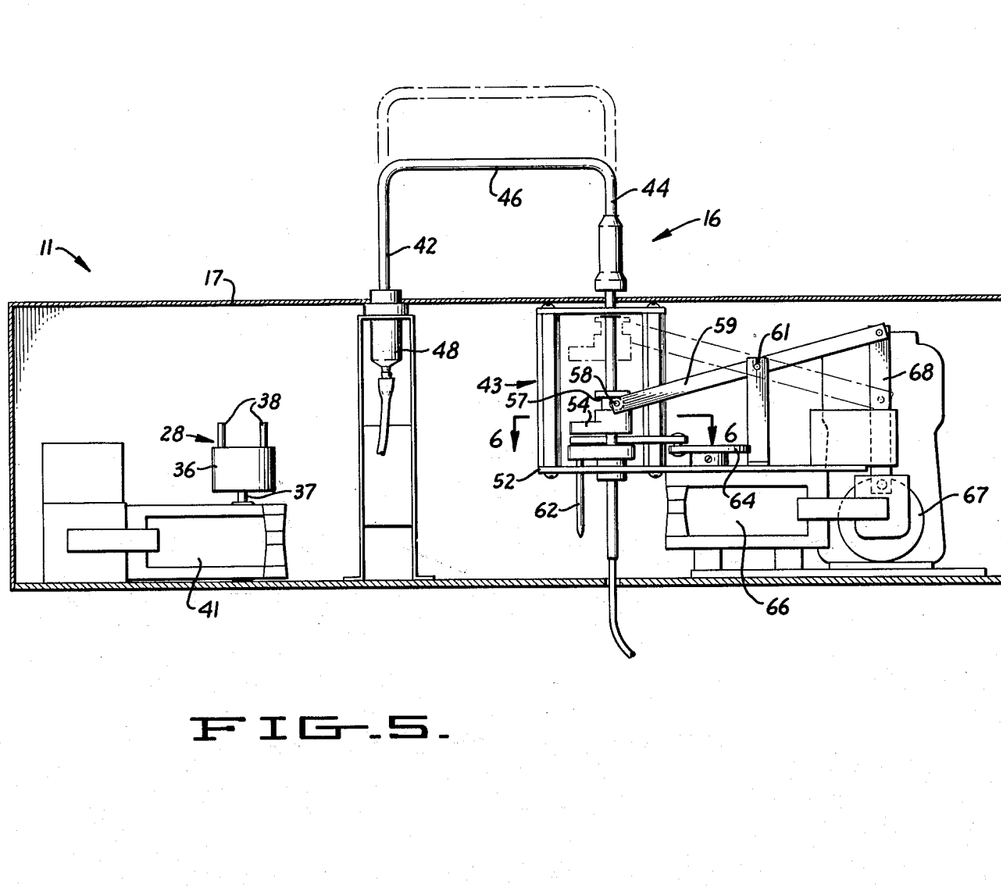
FIGURE 5, a cross-sectional view of the apparatus shown in FIGURE 2 taken substantially in the plane of line 5—5 thereof.
Figure 6:
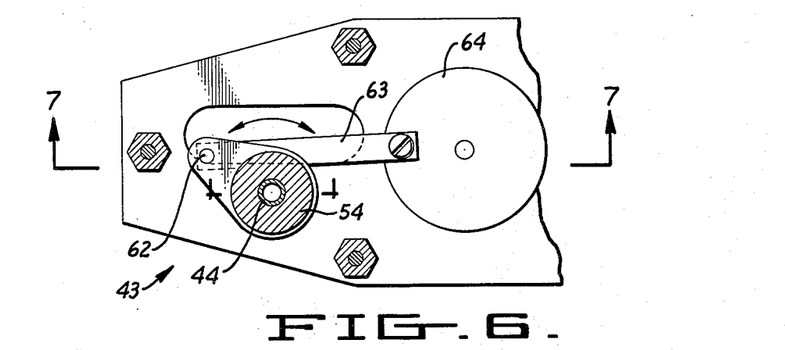
FIGURE 6, a cross-sectional view illustrating a portion of the apparatus taken substantially in the plane of line 6—6 of FIGURE 5.
Figure 7:
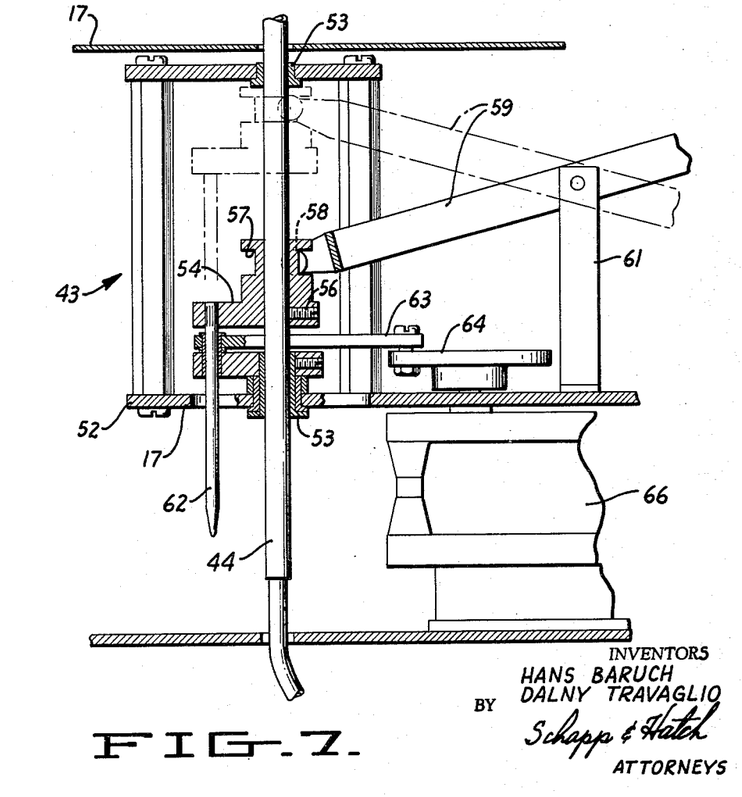
FIGURE 7, a sectional view of the apparatus illustrated in FIGURE 6 taken substantially in the plane of line 7—7 thereof.

Referring more particularly to FIGURES 5 through 7, it is seen that the tube 44 is journaled through the housing 17 of apparatus 11 for axial and rotatable movement. Specifically, the tube 44 is carried in a frame 52 mounted in the housing, and the tube is journaled through frame 52 in bearings 53. In order to provide communication between the mechanism for moving the tube 44 and the tube 44, there is provided a gripping member 54 which is held in fixed position with respect to tube 44 by set screw 56. This gripping member contains a neck portion 57 adapted to receive rollers 58 or other means for providing engagement of the end of an arm 59 therein. In this way, the pivoting motion of arm 59 which is provided by a swivel connection on post 61 provides movement of the gripping member 54 to the position shown in phantom in FIGURE 5, thereby raising tube 44 and the associated probe 42 to the position also shown in phantom. Gripping member 54 also contains a pin 62 which is adapted to receive rotational movement and impart a rotational movement to tube 44 which in turn rotates probe 42.

Pin 62 is rotated by means of arm 63 which is mounted on a crank wheel 64. The crank wheel 64 is rotated through fixed arcs and halted at desired positions by a gear motor 66 which provides this mechanical movement. In this way, partial rotational movement of wheel 64 is translated to the tube 44 which in turn effects the desired movement of the probe. Up and down movement of the probe is provided by pivoting arm 59 as mentioned above. As best seen in FIGURE 5, this pivoting is accomplished by rotation of wheel 67 which carries connecting rod 68 in a pivotal mount on its periphery, said arm 68 also being pivotally mounted to the end of arm 59 as shown. Wheel 67 is rotated by a motor 69 as shown in FIGURE 2. The motor 69 and gear motor 66 are programmed together so that the up and down and rotational movement of the probe occur in alternative fashion. This may be accomplished in any suitable manner. For example, limit switches and relays which shut off the motor at the end of a cycle and cause movement of the next motor may be used, or any other automatic control means capable of accomplishing the desired results may be utilized. The important requirement is to provide the desired rotational and axial movement of the probe.

The probe also has a pumping system associated therewith for causing sample to be taken up into the probe and for discharging a measured quantity of such sample at the desired sample station after the probe has been moved by the transfer mechanism as described above. In addition, the pumping system also provides for the addition of diluent or reagent when desired.

Figure 8:
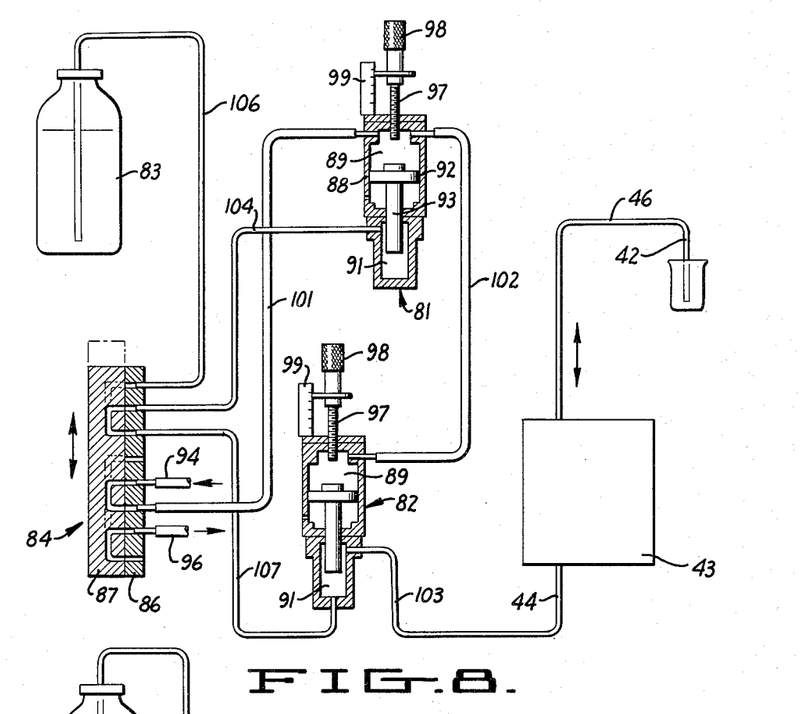
FIGURE 8, a schematic showing a pumping system utilized in the invention for transferring a measured quantity of sample and reagent.

A typical pumping system which may be used in the present invention to provide the desired movement of liquids through the probe is illustrated in detail in FIGURE 8. As there shown, the system is operatively connected to line 44 which is carried in transfer mechanism 43 and is in communication with probe 42. The system also comprises pumps 81 and 82, reagent or diluent container 83, valve 84, and various connecting lines. Valve 84 may be any valve capable of providing the position shown with valve blocks 86 and 87 aligned as shown in FIGURE 8, and said blocks being relatively movable so as to be aligned as shown in phantom in FIGURE 8. A typical valve and mechanism suitable for operating the same is described and claimed in the copending application Serial No. 183,506 of Erik W. Anthon entitled Valve, filed March 29, 1962, and assigned to the assignee of the present application.

Both pumps 81 and 82 are similarly constructed and adapted to operate by means of air pressure or vacuum, with the air pressure causing each of the pumps to move a piston or plunger in one direction, and the vacuum causing each of them to move the piston or plunger in reverse direction. Thus each pump comprises a housing 88 enclosing chambers 89 and 91 with chambers 89 adapted to receive pressure or vacuum and activate a piston 92 having a plunger associated therewith which communicates down into chamber 91 and effects movement of liquid into and out of said chamber. Movement of the piston is determined by the valve position with one valve position providing communication between chambers 89 and pressure line 94 while the other valve position provides communication with chambers 89 and vacuum line 96.

In order to accurately adjust the volume of liquid taken into the chambers 91, stop means 97 are provided to limit the movement of the pistons 92. In order to adjust the stop means 97, knurled handle 98 is provided for rotation of the stop means through the sealed threaded engagement with the housing 88 as shown in FIGURE 8. The setting may be accurately adjusted on a suitable gage 99 which may include a vernier device (not shown) or any other conventional measuring scale for providing accurate measurements.

In operation, the transfer device and the pump system work in cooperating fashion so that the pumps perform their operations while the probe is halted in the desired stationary position. Thus in a typical procedure, the samples are provided in the containers of the inner circle of containers in the turntable in advance of the position marked A in FIGURE 2. The transfer mechanism and pumping system is programmed to take up a measured quantity of sample at position A and transfer it to the position B while simultaneously adding a measured quantity of diluent or reagent to the sample at B. The transfer mechanism is also programmed to move the probe over to well 48 where wash water is provided for additional cleaning of the probe between samples. This washing is optional because the system is constructed to provide the transfer of samples in a manner that substantially eliminates contamination from prior samples transferred.

The operation of a transfer device and pumping system will be described beginning with the probe 42 immersed in the container at A. With the probe thus in place, valve 84 is adjusted to that valve block 87 is moved to the position shown in phantom and the passages within the valve block which are operative are also positioned as shown in phantom in the drawing. Line 101 then provides communication between upper chamber 89 and the suction line 96 which is permanently connected to an air compressor (not shown). The vacuum from the suction line is also provided in lower chamber 89 by virtue of the parallel connection of the chambers effected through line 102. This suction then reduces the pressure in chamber 89 to cause the pistons 92 and associated plungers 93 to move upwards and enlarge the volume in chambers 91 according to the settings provided by stop means 97.

In this way, the amount of liquid drawn into the pumps is accurately determined by the setting of associated gages 99. Thus, accurately measured quantities of sample are drawn up into the probe 42 as liquid is forced into chamber 91 through line 103 and line 44. Simultaneously, reagent or diluent is drawn into the upper chamber 91 by drawing in liquid through line 104, and line 106 from reservoir 83.

When sufficient time has elapsed for the pumps to fill, the transfer mechanism is activated by relays or other suitable devices so that the transfer device 43 first moves the probe 42 axially upwards until it clears the container, then rotational movement is imparted to tube 44 so that the probe 42 is swung in an arc until it is positioned over station B, and then the transfer device ceases operation for a time sufficient to allow the next pumping operation to take place.

This next pumping operation is achieved simply by moving the valve block 87 to the position shown in the drawing where the chambers 89 and associated lines 101 and 102 are in communication with pressure line 94. With chambers 89 thus pressurized, the plungers 93 are moved downward until the end of the stroke is reached. This movement causes the liquid in chambers 91 to be expelled so that the sample in the probe represented by the change of volume in lower chamber 91 is expelled out through the probe into the sample container at B, while the diluent or reagent carried in system and represented by the changed volume in upper chamber 91 passes out through line 104, and through line 107, through the lower chamber 91 and out through the probe tube.

In this way, the probe is washed clean of sample by the reagent or diluent added and a measured quantity of sample and reagent or diluent are delivered. It is also seen that the pumps and associated lines are kept full of reagent or diluent at all times so that extremely accurate measurements are provided because the plungers of the pumps are operating on substantially incompressible liquids.

After the sample and diluent has been discharged at site B, the transfer device operates to move the probe arcuately over to the well 48, if desired, and then axially downward into the well 48 where a constant supply of fresh water is kept to wash off the outside of the probe tube. If desired, the well and associated movement may be omitted because the probe is made of a material having a hydrophobic surface and sample or other liquids do not adhere to the outside surface of the tube.

Other operations are also possible when the transfer device and pumping system are included in this invention. For example, the sample may be picked up and transferred out of the turntable system over to another module such as turntable 51. Alternatively, the sample may be picked up from such a module as turntable 51 and transferred into the systems. Such operations are achieved simply by changing the controls effecting the programming and the apparatus is capable of these various operations.

After the measured sample is provided as explained above, it is moved around the turn table through the various sample stations according to the preset program. In certain procedures, it is necessary to add other reagent materials in measured quantities, and these materials should be maintained in the sample for a controlled period of time. Referring again to FIGURES 1 and 3, there is shown a plurality of delivery probes 111 having a tube portion 112 carried in the central hub 18 of the apparatus. The delivery probes are rotatable within the hub and have extending means 113 so that the length of the probe may be adjusted. In this way, manual adjustments of the probe are made by the operator so as to position the probe designed to deliver a measured quantity of reagent at the position needed as the apparatus is programmed for a particular determination.

Figure 4:
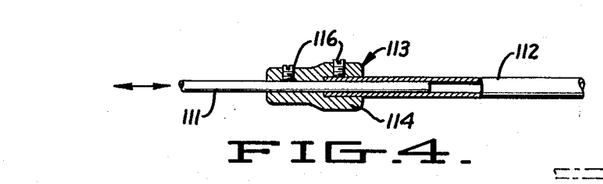
FIGURE 4, a fragmentary elevational view, partly in section, of a tubular structure used in a preferred form of a probe which is utilized in the present invention.

The extending means 113 here shown is illustrated in detail in FIGURE 4, in which the probe tube 111 is shown as telescoping within the tube 112 at their point of connection horizontally above the turntable as shown in FIGURE 1. The tubes are telescoped into each other and leakage is prevented by using tubes made of Teflon or similar materials which are self lubricating and slide sealingly within one another. The telescoped position is then fixed by holding means 114 which contains set screws 116 for securing the desired position.

Although we have shown three delivery probes in FIGURE 1, it will be appreciated that any number of delivery probes may be provided, and that even though three are provided, only one or two may actually be used. In fact, it is possible to omit the use of the delivery probes altogether where additional reagent is not required.

Figure 9:
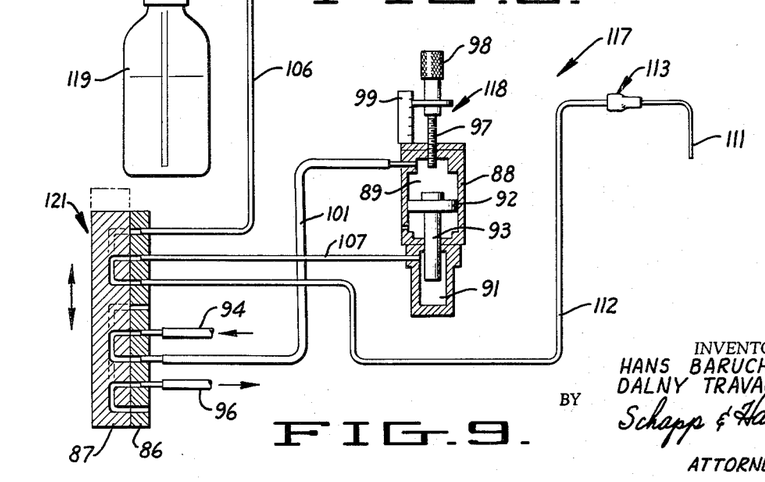
FIGURE 9, a schematic showing of a pumping system of the apparatus for delivering and/or removing liquids from any of the sample sites.

In FIGURE 9, there is shown a reagent delivery device or means 117 for delivering reagent or other liquids through the probe 111 at any desired station. The device 117 comprises a pump 118 which is similar in construction to the pumps 81 and 82, a reagent container 119 and a valve 121 which is similar to the valve 84 of FIGURE 8. Since the valve 121 and pump 118 are similarly constructed to the valve 84 and pumps 81 and 82 of FIGURE 8, the description above is referred to and the parts are identified by the same reference numbers. It will be appreciated that different pump systems can be used or other reagent delivery devices. However, where precise volumes are to be delivered, we prefer to use an apparatus capable of the performance obtained by those shown in FIGURES 8 and 9 where the delivered volumes may be carefully adjusted on the gages 99.

In operation, the valve 121 is activated to connect the pump through to pressure line 94 or vacuum line 96. The pressure and vacuum are provided by a compressor or any other suitable pressure and vacuum supply system. Thus, by sliding blocks 86 and 87 of valve 121, the valves are positioned so as to all be in the position shown, or all be in the position shown in phantom in FIGURE 9. Thus, in the position shown, air pressure is entering through line 94 and traveling through line 101 into chamber 89 where it forces piston 92 downward until a complete stroke is achieved. As the piston 92 is forced downward, liquid is forced out of chamber 91 through line 107 and line 112, the liquid then exiting from delivery probe 111 at the desired site. When the piston reaches its downward limit of travel, no further action takes place until the valve 121 is moved to the other position as shown in phantom in FIGURE 9. When this movement takes place, the upper chamber 89 is in communication with vacuum line 96 through line 101 so as to provide upward movement of the piston 92. As the piston moves upward, reagent is drawn into chamber 91 through lines 107 and 106.

The upward movement of piston 92 is determined by the setting of stop means 97 according to the indicia shown on gage 99. In this way, accurately controlled volumes of reagent are brought into the chamber 91 and delivered therefrom through the probe 111 according to signals received from the master control system.

While the delivery probes 111 are satisfactory for adding materials to the containers at desired positions, the end of the probe should be clear of the container so as to allow relative rotation of the containers with respect to the probes. Accordingly, where it is desirable to utilize a probe which should extend downwardly into the container, the invention provides probes 122 having means associated therewith for moving the probes up and down so as to move into and out of the containers at the site of operation.

The probes 122 are particularly useful where it is desired to remove treated sample from the container, to add and remove wash solution from the container for cleaning purposes, and to provide dry air within the container for drying out a cleaned container in preparation for recycling and receipt of the next sample.

In the apparatus illustrated, probe 122 is used for washing and drying as indicated above, however, the sample may be removed from the sample container by any of a number of methods. Preferably, the sample is removed by using probe 122 and pumping the sample out through the probe and into a cuvette in place in a colorimeter. Such a system is described and claimed in the copending patent application of Hans Baruch, an inventor of the present invention, and Erik W. Anthon, Serial No. 247,622, filed December 27, 1962, entitled Automatic Spectrophotometric System, and assigned to the assignee of the present application. Alternatively, the sample could be moved from the container in the turntable of the present apparatus to an outside position by means of a transfer device 16. This movement may be accomplished by a device carried in the present apparatus or by a device carried outside of the present apparatus.

The vertical movement of the probe 122 is provided by moving the tube section 123 which is in communication with probe 122 and which passes through the center of the turntable within the hub 18. The tube section 123 is carried by a sleeve 124 which is journaled for axial movement within the hub 18 and held against rotation by a suitable key and keyway. Axial movement of tube 123 and probe 122 with respect to sleeve 124 is positively prevented by holding the tube 123 in the upper section 126 of the collar where the tube 123 is bent at a 90° angle as best shown in FIGURE 3. The tube may be held in the sleeve by a cover plate 127 which clampingly holds the tube in position. Thus, it is seen that vertical movement of the sleeve 124 provides corresponding vertical movement at the probe 122.

This vertical movement is effected by an arm 128 which is pivoted to a post 129 at 131. This arm then serves as a lever with one end of the arm being provided with a roller 132 which grips a neck portion 133 of the sleeve 124, while the other end is held in a slide 134 which slide is rotatably held on the periphery of wheel 136. In this way, rotation of wheel 136 causes movement of lever arm 128 between the position shown in solid lines in FIGURE 3 and the position shown in phantom. Each half revolution of wheel 136 is then used to provide the necessary up and downward movement of the probe 122.

Rotation of wheel 136 is provided by motor 137 which is programmed with respect to the other motors of the system to provide a half revolution of rotation to wheel 136 at the proper timed sequence with relation to the other operation of the device.

The construction of probe 122 is similar to the construction of delivery probes 111, the probes 122 having a pair of telescoped tubes in the horizontal portion thereof, whereby the length of the tube may be adjusted, and a holding means 114 for maintaining the adjusted position. While we have shown the probes communicating to tubes which pass downwardly through a hollow center of the device, it is also possible to have the probes communicate to the associated equipment in other ways, and to provide a different means for providing the up and down motion of probes 122. However, it is an important feature of this invention that the probes be held near the center of the apparatus so that easy manual adjustment may be made by the operator simply by rotation of the tube to be adjusted.

Probes 122 are designed to reach down into the bottoms of the containers, and the containers are preferably designed with the sloped sides shown in FIGURE 3 so that substantially all of the liquid is drawn out of the container as liquid is drawn into probe 122. In this way, the sample may be removed by probe 122 and transferred to a position in a colorimeter or other sensing device by utilizing the proper pumping arrangement. A typical pumping arrangement through the tube for effecting this type of transfer is described and claimed in the copending application of Hans Baruch, an inventor in the present application, and Erik W. Anthon, Serial No. 228,337, filed October 4, 1962, entitled Cuvette and Means for Supplying Same, and assigned to the same assignee as the present application.

After the sample has been removed from the container either through a probe 122 or by a transfer device 16, the containers are preferably washed so that a clean container is presented for a new cycle of operation. The washing is accomplished by delivering wash water either through delivery proble 111 or probe 122 and withdrawing wash water through probe 122. This withdrawal may be effected by using the pumping system of FIGURE 9 with probe 122 being in communication with line 106 so that the pump draws material out of the sample tube in much the same manner as it drew reagent from container 119; the liquid is then discharged to a drain through the line at the opposite end of the system.

A number of desirable washing patterns may be utilized depending upon the amount of cleaning required and the space available. Thus, it is possible to add wash water at one station and remove it from the following station or it is possible to add water at a fixed station through delivery probe 11 while simultaneously removing the water at the same site by means of a probe 122. If desired, the washing operation is repeated for a number of times and finally the wash tube is passed to a station where it receives a probe 122 which delivers dry hot air. In this way, the container is dried so that a clean dry container is presented for a new cycle of operation.

Another feature of the present invention resides in the programmed application of heat to the samples during a fixed period of time in the cycle of operation. This heat may be applied to the sample containers desired by any suitable means. However, the preferred form is illustrated in FIGURE 3 where insulated electrical heating elements in tape form are wound around a suitable number of the housings 138 which provide the recesses 31 in the outer row of sample stations of the turntable. A power source is transmitted to the heating element 139 by suitable lead wires (not shown) carried within and rotatable with the turntable and communicating with strips 141 and 142 which are circularly disposed at the bottom of the turntable. The circular strips 141 and 142 then receive electricity through brushes 143 which are electrically connected through lines 144 to an adjustable thermostat (not shown) and power source. The adjustable thermostat may be set by the operator to provide easy programming of this heat. In general, the heating elements 139 are disposed around all of the tube housings of the outer row, and programming is accomplished by varying the distance through which the samples are moved.

The electrical controls consist of a cycle timer 145 which is adjusted by dial 146 and a time delay 147. The cycle timer is adjusted to set the length of time that the turntable is halted, and the time delay adjusts a time delay relay which allows sufficient time for pump strokes to be completed before any transfer probes move to another position. The mechanism operates by having a particular cycle adjusted, for example, the dial may be set for 36 seconds, and with such an adjustment, the turntable moves a notch or advances one station by a half rotation of drive means 28 at the beginning of each 36 second interval. With such a setting, 100 analyses per hour are obtained. The timed delay is adjusted to allow sufficient time for pump strokes before any transfer probes move into position, and simply operates a delay relay which holds the other operations of the mechanism. No other electrical controls are necessary.

Thus, in operation of the machine, the drive means 28 first advances the turntable to present the next sample containers at each of the operation sites. The various probe mechanisms are then put into operation by means of automatic switching responsive to this turntable movement so that each of the probes move down into the sample container where they are programmed to do so. With the probes in position, a switch is tripped by the mechanism at the end of the movement in order to activate the means for switching the pump valve and pumping operation begins. The pump valve also has its switches associated therewith, but its switch system includes the time delay relay mentioned above to allow time for pumping to take place. Then the relay activates the motors for continuing the probes through their programmed movement. In this way, each movement occurs sequentially and activates suitable micro switches for causing the next motion in the cycle to take place.

It is of course necessary to use such programming and a sufficiently long cycle on cycle timer 145 to allow all these movements to take place. The actual length of time will vary, depending on the programming used. For example, the setting of the time delay relay to allow pumping operation will depend upon the extent of the pumping operation to be carried out. In most cases, there will be adequate time on the cycle and no adjustment of the time delay relay will be necessary.

The manual settings are simply made by the operator by manually positioning various probes at the positions desired. The pump settings are made by adjusting the pump dials within the housing, and access is provided by hinged doors in the side of the unit. Other manual adjustments may also be made, such as the setting of a thermostat to adjust the control of the heating elements or any other mechanisms that may be added by the operator. Incubation times in the process module are determined by the arc of the turntable between the reagent addition points and the transfer stations for moving the sample to cuvettes or the like for final readout. In other words, the time is determined by the number of stations through which the sample moves multiplied by the setting provided on the cyclic timer.

For the sake of illustration, the following discussion is given to show how a glucose analysis could be set up using the apparatus of the invention. A protein free filtrate of the sample is to be used, and this sample is either provided by the operator to the inner row of the turntable, or it is moved to such a position from another module by the transfer device. A procedure calls for incubating the sample at a temperature of 100° C. for a period of 7½ minutes after treatment of the sample with potassium cyanide and potassium ferricyanide solution, in order to provide time for the color development. With the cycle timer set for 30 seconds, the solution moves one position every 30 seconds so it will take 15 moves or 15 tube positions to provide this time duration. Therefore, the technician rotates the transfer probe which will remove the sample and take it to a cuvette for final reading in a colorimeter at a position which is 15 tube positions from the point where sample and reagent are delivered to the outer row. The wash water addition and test tube draining probe can then be located at positions 16 and 17 respectively.

The example illustrates the importance of having the reagent addition, cuvette transfer, wash, and drain probes radiate from the center. With this arrangement, maximum flexibility of incubation time is provided while maintaining the same rate of analyses. Any incubation time up to 25 minutes can be set with no sacrifice at the rate of 120 samples per hour. For example, if a 15 minute incubation is called for with the set-up discussed above for glucose determination, the cuvette transfer probe is simply moved to position 30 and the wash water addition and test tube draining probes moved to positions 31 and 32. When it is necessary to change volume settings, temperature settings, incubation times, and reagents, toggle switch 148 is moved to the off position and the desired adjustment is made. The cycle switch 149 and the button 151 above it are then activated to begin operation.

From the foregoing description, it is seen that we have provided a machine capable of performing certain complicated wet chemistries according to exact analytical procedures in the same manner as they should be performed by the laboratory technician. In addition, the machine provides uniformity of procedure as well as a reliable accuracy.

The machine may also be integrated into a larger analytical system, in which other operations are carried out, or it may be used in combination with various measuring devices for measuring the final value indicative of the analysis desired. Thus the sample may be operated upon in any of a variety of ways before entry into the machine and after delivery from the machine.

For example, a filtering or centrifuging device could be used to separate a material from the original sample by precipitation and removal of the material, and this filtering device could be incorporated with the apparatus of the present invention to provide such samples. Another application is the use of the containers to collect fractions coming from a column where the different fractions are to be analyzed. In other words, the inner row of containers which are moving in cyclic timed sequence can be used to serve as a fraction collector.

Accordingly, it is seen that we have provided an automated system capable of accomplishing complicated analytical procedural steps, which is easily programmed to handle any of a variety of standard procedures.

We claim:

1. An apparatus for automatically conducting analytical procedural steps, comprising a plurality of containers for receiving liquid and moving through a plurality of sample stations, conveying means for conveying said containers in a cyclic path and through said plurality of stations, a transfer device capable of moving a pipette from an operative position in a container containing samples at one of said sample stations to an operative position in a container at another of said sample stations, pump means capable of taking up a measured quantity of liquid in the pipette when the probe is in operative position to receive sample and delivering liquid by reverse flow when the probe is in operative position at another container, said pump means also being capable of transferring liquid in the pipette in a form which is substantially free from contamination by prior liquids transferred, reagent delivery means having an outlet positionable at any of a number of stations, and means for removing the treated sample at one of said sample stations.

2. An apparatus for automatically conducting analytical procedural steps, comprising a plurality of containers for receiving liquid and moving through a plurality of sample stations, conveying means for conveying said containers in a cyclic path and through said plurality of stations, a transfer device capable of moving a pipette from an operative position in a container containing sample at one of said sample stations to an operative position in a container at another of said sample stations, pump means capable of taking up a measured quantity of sample liquid in the pipette from the sample container when the probe is in operative position at said sample container and delivering liquid by reverse flow when the probe is in operative position in another container at one of said stations, said pump means having means associated therewith for transferring a measured quantity of additional liquid through said pipette after delivery of said sample liquid whereby the probe is washed clean of said liquid sample to prevent contamination of the next sample to be taken up, reagent delivering means having an outlet positionable at any of a number of stations, and means for removing the treated sample at one of said sample stations.

3. An apparatus for automatically conducting analytical procedural steps, comprising a plurality of containers for receiving liquid and moving through a plurality of sample stations, conveying means for conveying said containers in a cyclic path and through said plurality of stations and holding said containers at a fixed period of time at said stations, a transfer device capable of moving a pipette from an operative position in a container containing sample at one of said sample stations to an operative position in a container at another of said sample stations, pump means capable of taking up a measured quantity of sample liquid in the pipette from a sample container when the pipette is in operative position at said container and delivering liquid by reverse flow when the pipette is in operative position in another container at one of said stations, said pump means having means associated therewith for transferring a measured quantity of additional liquid through said pipette after delivery of said sample liquid whereby the pipette is washed clean of said sample liquid to prevent contamination of the next sample to be taken up, reagent delivery means having an outlet positional at any of a number of sample stations, means for removing the treated sample at one of said sample stations, and means for washing and drying said containers positioned between the station for removing treated sample and the station for adding fresh sample.

4. An apparatus for automatically conducting analytical procedural steps, comprising a plurality of containers for receiving liquid and moving through a plurality of sample stations, conveying means for conveying said containers in a cyclic path and through said plurality of stations and holding said containers for a fixed period of time at said stations, a transfer device capable of moving a pipette from an operative position in a container containing sample at one of said sample stations to an operative position in a container at another of said sample stations, pump means capable of taking up a measured quantity of sample liquid in the pipette from a sample container when the pipette is in operative position at said container and deliverying liquid by reverse flow when the pipette is in operative position at another container at another of said stations, said pump means having means associated therewith for transferring a measured quantity of additional liquid through said pipette after delivery of said sample liquid whereby the pipette is washed clean of said sample liquid to prevent contamination of the next sample to be taken up, reagent delivery means having an outlet positionable at any of a number of stations, means for removing the treated sample at one of said sample stations, and means for heating the sample for a fixed period of time as it is carried through the apparatus.

5. An apparatus for automatically conducting analytical procedural steps, comprising a plurality of containers for receiving liquid and moving through a plurality of sample stations, conveying means for conveying said containers in a cyclic path and through said plurality of stations in a programmed manner whereby the containers are held stationary for a controlled period of time at each station, a transfer device capable of moving a probe from an operative position in a container containing sample at one of said sample stations to an operative position in a container at another of said sample stations, pump means capable of taking up a measured quantity of sample liquid in the probe from a sample container when the probe is in operative position at said container and delivering liquid by reverse flow when the probe is in operative position in another container at one of said stations, said pump means having means associated therewith for transferring a measured quantity of additional liquid through said probe after delivery of said sample whereby the probe is washed clean of said sample liquid to prevent contamination of the next sample, reagent delivery means containing conduits radiating from a central portion of said apparatus having an outlet positionable at any of a plurality of sample stations, means for removing the treated sample from a selected sample station and delivering the sample to a site for further automated analyses, means for washing and drying said sample containers after removal of treated sample therefrom, said means containing conduits radiating from a central portion of the apparatus and having probes positionable at selected sample stations, and means for moving the probes associated with the means for washing and drying sample containers in a vertical direction for effecting delivery and removal of wash liquid.

6. The apparatus for automatically conducting analytical procedural steps defined in claim 5, in which the conduits radiating from a central portion of the apparatus comprise telescoping sections for adjusting the length of the conduit and allowing accurate positioning at a selected sample station.

7. An apparatus for automatically conducting analytical procedural steps, comprising a turntable, containers carried by the turntable for receiving liquid at any of a plurality of sample stations, means for rotating said turntable to convey said containers through said stations, indexing drive means associated with the conveying means for adjusting and accurately fixing the position of said containers at said stations, a transfer device capable of moving a pipette from an operative position in a container containing sample at one sample station to another operative position in a container at one of said sample stations, pump means capable of taking up a measured quantity of liquid in the pipette when the pipette is in operative position to receive sample and delivering liquid by reverse flow when the pipette is in operative position at another container, said pump means also being capable of transferring liquid in the pipette in a form which is substantially free from contamination by prior liquids transferred, reagent delivery means having an outlet positionable at any of a number of stations, and means for removing the treated sample at one of said sample stations.

8. An apparatus for automatically conducting analytical procedural steps, comprising a turntable, containers carried by the turntable for receiving liquid at any of a plurality of sample stations, means for rotating said turntable to convey said containers through said stations, indexing drive means associated with the conveying means for adjusting and accurately fixing the position of said containers at said stations, a transfer device capable of moving a probe from an operative position in a container containing sample at one sample station to another operative position in a container at another of said sample stations, pump means capable of taking up a measured quantity of sample liquid in the probe from the sample container when the probe is in operative position at said sample container and delivering liquid by reverse flow when the probe is in operative position in another container at one of said stations, said pump means having means associated therewith for transferring a measured quantity of additional liquid through said probe after delivery of said sample liquid whereby the probe is washed clean of said liquid sample to prevent contamination of the next sample to be taken up, reagent delivering means having an outlet positionable at any of a number of stations, and means for removing the treated sample at one of said sample stations.

9. An apparatus for automatically conducting analytical procedural steps, comprising a turntable, containers carried by the turntable for receiving liquid at any of a plurality of sample stations, means for rotating said turntable to convey said containers through said stations, indexing drive means associated with the conveying means for adjusting and accurately fixing the position of said containers at said stations, a transfer device capable of moving a pipette from an operative position in a container containing sample at one sample station to another operative position in a container at another of said sample stations, pump means capable of taking up a measured quantity of sample liquid in the pipette from a sample container when the pipette is in operative position at said container and delivering liquid by reverse flow when the pipette is in operative position in another container at one of said stations, said pump means having means associated therewith for transferring a measured quantity of additional liquid through said pipette after delivery of said sample liquid whereby the pipette is washed clean of said sample liquid to prevent contamination of the next sample to be taken up, reagent delivery means having an outlet positionable at any of a number of sample stations, means for removing the treated sample at one of said sample stations, and means for washing and drying said containers positioned between the station for removing treated sample and the station for adding fresh sample.

10. An apparatus for automatically conducting analytical procedural steps, comprising a turntable, containers carried by the turntable for receiving liquid at any of a plurality of sample stations, means for rotating said turntable to convey said containers through said stations, indexing drive means associated with the conveying means for adjusting and accurately fixing the position of said containers at said stations, a transfer devcie capable of moving a pipette from an operative position in a container containing sample at one sample station to another operative position in a container at one of said sample stations, pump means capable of taking up a measured quantity of sample liquid in the pipette from a sample container when the pipette is in operative position at said container and delivering liquid by reverse flow when the pipette is in operative position at another container at another of said stations, said pump means having means associated therewith for transferring a measured quantity of additional liquid through said pipette after delivery of said sample liquid whereby the pipette is washed clean of said sample liquid to prevent contamination of the next sample to be taken up, reagent delivery means having an outlet positionable at any of a number of stations, means for removing the treated sample at one of said sample stations, and means for heating the sample for a fixed period of time as it is carried through the apparatus.

11. An apparatus for automatically conducting analytical procedural steps, comprising a turntable, containers carried by the turntable for receiving liquid at any of a plurality of sample stations, means for rotating said turntable to convey said containers through said stations, indexing drive means associated with the conveying means for adjusting and accurately fixing the position of said containers at said stations, a transfer device capable of moving a probe from an operative position in a container containing sample at one sample station to another operative position in a container at another of said sample stations, pump means capable of taking up a measured quantity of sample liquid in the probe from a sample container when the probe is in operative position at said container and delivering liquid by reverse flow when the probe is in operative position in another container at one of said stations, said pump means having means associated therewith for transferring a measured quantity of additional liquid through said probe after delivery of said sample whereby the probe is washed clean of said sample liquid to prevent contamination of the next sample, reagent delivery means containing conduits radiating from a central portion of said apparatus having an outlet positionable at any of a plurality of sample stations, means for removing the treated sample from a selected sample station and delivering the sample to a site for further automated analyses, means for washing and drying said sample containers after removal of treated sample therefrom, said means containing conduits radiating from a central portion of the apparatus and having probes positionable at selected sample stations, and means for moving the probes associated with the means for washing and drying sample containers in a vertical direction for effecting delivery and removal of wash liquid.

12. The apparatus for automatically conducting analytical procedural steps defined in claim 11, in which the conduits radiating from a central portion of the apparatus comprise telescoping sections for adjusting the length of the conduit and allowing accurate positioning at a selected sample station.

13. An apparatus for automatically conducting analytical procedural steps, comprising a turntable holding a plurality of containers arranged at a plurality of sample stations disposed in a circular manner around the turntable in symmetrical fashion, means for rotating the turntable an amount sufficient to advance the sample containers one position at a time and halting the turntable for an adjustable length of time between such moves, a transfer device capable of moving a pipette from an operative position in a container containing sample to another operative position in another container at another of said sample stations, said transfer device including a pump means capable of taking up a measured quantity of sample liquid in the pipette from a sample container when the pipette is in operative position at said container and delivering liquid when the pipette is in operative position in another container at one of said stations, said pump means having means associated therewith for transferring a measured quantity of additional liquid through said pipette after delivery of said sample liquid whereby the pipette is washed clean of said sample liquid to prevent contamination of the next sample to be taken up, reagent delivery means having an outlet positionable at any of a number of sample stations, means for removing the treated sample at one of said sample stations, and means for washing and drying said containers positioned between the station for removing treated sample and the station for adding fresh sample.

14. An apparatus for automatically conducting analytical procedural steps, comprising a turntable holding a plurality of containers arranged at a plurality of sample stations disposed in a circular manner around the turntable in symmetrical fashion, means for rotating the turntable an amount sufficient to advance the sample containers one position at a time and halting the turntable for an adjustable length of time between such moves, a transfer device capable of moving a probe from an operative position in a container containing sample to another operative position in another container at another of said sample stations, said transfer device including a pump means capable of taking up a measured quantity of sample liquid in the probe from a sample container when the probe is in operative position at said container and delivering liquid when the probe is in operative position in another container at one of said stations, said pump means having means associated therewith for transferring a measured quantity of additional liquid through said probe after delivery of said sample whereby the probe is washed clean of said sample liquid to prevent contamination of the next sample, reagent delivery means containing conduits radiating from a central portion of said apparatus having an outlet positionable at any of a plurality of sample stations, means for removing the treated sample from a selected sample station and delivering the sample to a site for further automated analyses, means for washing and drying said sample containers after removal of treated sample therefrom, said means containing conduits radiating from a central portion of the apparatus and having probes positionable at selected sample stations, and means for moving the probes associated with the means for washing and drying sample containers in a vertical direction for effecting delivery and removal of wash liquid.

15. An apparatus for automatically conducting analytical procedural steps, comprising a turntable holding a plurality of containers arranged at a plurality of sample stations disposed in a circular manner around the turntable in symmetrical fashion, means for rotating the turntable an amount sufficient to advance the sample containers one position at a time and halting the turntable for an adjustable length of time between such moves, a transfer device capable of moving a probe from an operative position in a container containing sample to another operative position in another container at one of said sample stations, said transfer device including a pump means capable of taking up a measured quantity of liquid in the probe from a container when the probe is in operative position in said container and delivering the liquid by reverse flow when the probe is in operative position at another container, said pump means also being capable of transferring liquid in the probe in a form which is substantially free from contamination by prior liquids transferred, and reagent delivery means containing conduits journaled for manual rotation at and radiating from a central portion of said apparatus and having an outlet positionable at any of a plurality of sample stations.

16. The apparatus defined in claim 15, in which the turntable carries an inner circle of sample containers and an outer circle of sample containers, and means for moving sample from sample containers at one of said circles to sample containers at the other of said circles.

17. The apparatus defined in claim 16, in which the conduits radiating from a central portion of the apparatus comprise telescoping sections for adjusting the length of the conduit and allowing accurate positioning at a selected sample station.

18. An apparatus for automatically conducting analytical procedural steps, comprising a turntable carrying a plurality of sample holders through a circular path, timed drive means for rotating the turntable and advancing the sample holders through a plurality of sample stations with equal time increments for each advance from the arrival of the holders at one station to the arrival of the holders at the next station, means for adding sample material to a container at one of said sample stations, means for adding a reagent to said sample in said sample container at another of said sample stations, said means for adding sample and means for adding reagent being adjustable for positioning at any of a desired number of sample stations apart to fix the time duration between operations, means for removing the sample after the addition of reagent at still another of said sample stations, and means for washing the container, said means for washing the container being located at a sample station between the sample station where the sample is removed and the sample station where the next sample is to be added to the container.

References Cited by the Examiner

UNITED STATES PATENTS

| 2,267,744 | 12/41 | Nordquist | 141—91 XR |
| 2,493,382 | 1/50 | Bell | 141—130 |
| 2,560,107 | 7/51 | Hewson | 23—253 |
| 3,081,158 | 3/63 | Winter | 141—130 XR |

FOREIGN PATENTS

| 834,635 | 5/60 | Great Britain. |
| 860,567 | 2/61 | Great Britain. |

LAVERNE D. GEIGER, *Primary Examiner.*

Dedication 3,192,968.—*Hans Baruch*, Berkeley, and *Dalny Travaglio*, Kensington, Calif. APPARATUS FOR PERFORMING ANALYTICAL PROCEDURES. Patent dated July 6, 1965. Dedication filed Mar. 2, 1970, by the assignee, *American Optical Corporation*.

Hereby dedicates the remaining term of said patent to the Public.

[*Official Gazette July 7, 1970.*]